United States Patent
Narcus

(10) Patent No.: US 7,925,454 B1
(45) Date of Patent: Apr. 12, 2011

(54) PROCESS FOR DETERMINING A REMAINING LIFE OF A DETERIORATED TURBINE COMPONENT

(75) Inventor: Andrew R Narcus, Loxahatchee, FL (US)

(73) Assignee: Florida Turbine Technologies, Inc., Jupiter, FL (US)

( * ) Notice: Subject to any disclaimer, the term of this patent is extended or adjusted under 35 U.S.C. 154(b) by 284 days.

(21) Appl. No.: 12/195,207

(22) Filed: Aug. 20, 2008

(51) Int. Cl.
- *G01D 21/00* (2006.01)
- *G01N 19/08* (2006.01)
- *G01N 19/00* (2006.01)
- *G06F 19/00* (2006.01)
- *G06F 17/40* (2006.01)

(52) U.S. Cl. ..... 702/34; 73/112.01; 73/865.8; 73/865.9; 340/679; 702/183; 702/187; 702/189

(58) Field of Classification Search .............. 73/112.01, 73/114.01, 114.77, 432.1, 865.8, 865.9, 866; 340/500, 540, 665, 679; 374/100, 101, 102, 374/141; 702/1, 33, 34, 127, 130, 132, 182, 702/183, 184, 187, 189

See application file for complete search history.

(56) References Cited

U.S. PATENT DOCUMENTS

| | | | | |
|---|---|---|---|---|
| 2,883,255 A | * | 4/1959 | Anderson | 346/34 |
| 3,237,448 A | * | 3/1966 | Howell et al. | 702/132 |
| 3,362,217 A | * | 1/1968 | Rush et al. | 73/112.01 |
| 3,527,086 A | * | 9/1970 | Evans et al. | 73/112.01 |
| 3,584,507 A | * | 6/1971 | Hohenberg | 73/112.01 |
| 5,042,295 A | * | 8/1991 | Seeley | 73/112.03 |
| 5,447,059 A | * | 9/1995 | Miller et al. | 73/112.03 |
| 7,810,385 B1 | * | 10/2010 | Narcus | 73/112.01 |

\* cited by examiner

*Primary Examiner* — Edward R Cosimano
(74) *Attorney, Agent, or Firm* — John Ryznic

(57) ABSTRACT

A process for determining a remaining useful life for a turbine airfoil that suffers from erosion or corrosion damage in order to reuse a component that still has acceptable remaining life. The process includes the steps of removing the damaged component, scanning the damaged component with an optical scanner such as a white light scanner to produce a 3D solid model of the damaged component, scanning a new component to produce a 3D solid model of the undamaged component, comparing the two 3D solid models to determine the amount of damage on the damaged component, determining the length of time the damaged component was used and the temperature at which it was exposed, and analyzing the 3D solid model of the damaged component to determine how much longer the part can be used before the component will suffer critical damage or the engine will suffer unacceptable performance.

15 Claims, 1 Drawing Sheet

PROCESS FOR DETERMINING A REMAINING LIFE OF A DETERIORATED TURBINE COMPONENT

FEDERAL RESEARCH STATEMENT

None.

CROSS-REFERENCE TO RELATED APPLICATIONS

None.

BACKGROUND OF THE INVENTION

1. Field of the Invention

The present invention relates generally to a process for determining a remaining life of a component (or, part) suffering from erosion or oxidation due to operation of the component (or, part) under relatively high temperatures, and more specifically to a process for determining a remaining life of a gas turbine engine airfoil exposed to relatively high temperatures under normal operation of the component in which the component suffers from erosion or oxidation damage.

2. Description of the Related Art Including Information Disclosed Under 37 CFR 1.97 and 1.98

In a gas turbine engine, such as an industrial gas turbine (IGT) or an aero gas turbine engine, stator vanes and shrouds, and rotor blades in the turbine section are exposed to an extremely high temperature gas flowing over the surface of these turbine components. In the forward or upstream stages of the turbine, the airfoils can be exposed to a gas flow temperature above the melting point of the metal alloy material. Without internal cooling, these airfoils could not be used under these conditions.

Turbine airfoils are typically made from superalloys with overlay or diffused coatings (TBC) which allow for high temperature exposure while offering high strength. One of the primary deterioration processes of a component occurs when superalloys and coatings react with oxygen that produce either or both sulfidation or high temperature oxidation or erosion damage to the base alloy or coatings. Sulfidation occurs at lower temperatures (below 1600 degrees F.) through damaging particulates found in the fuel burned to produce the hot gas flow. Sulfur contained in the fuel will produce a sulfur oxide buildup on the airfoil surface that—through time—will erode the surface of the airfoil or turbine component. Salts contained in the compressed air used to burn the fuel can also build up on the surface of the airfoil and will produce erosion.

Oxidation and erosion is the process when a second primary deterioration process of a component occurs from airfoils or components that are exposed to high temperatures (above 1600 degrees F.) which produce a depletion of the surface protecting alloy and coating elements, resulting in the coating and alloy surface oxidation and subsequent erosion. When the erosion on an airfoil or turbine component becomes too severe, the performance of the component can become significantly reduced, or the structural integrity of the airfoil can be impacted such that thermo-mechanical fatigue (TMF) cracks can occur on the component or the component breaks. Broken components passing through an engine can produce additional damage to the engine beyond that of the corrosion or erosion problems.

Corrosion can appear as a single location on a component in which the location can continuously erode until a hole appears in the component. If the component is an internally cooled airfoil, the resulting hole can allow for the cooling air to pass through the hole and out into the gas path. In some cases, this cooling air leakage could be critical to the performance of the airfoil or component and the engine.

Engine-run turbine airfoils or components are typically reused in an engine if the damage to the component is not too severe such that the component will last during the next cycle of engine operation. The determination of the remaining life of an eroded component based on the amount of alloy and coating loss which has occurred is critical to determining whether the component can continue in operation for a predetermined amount of time.

BRIEF SUMMARY OF THE INVENTION

It is an object of the present invention to define a process to determine a remaining life for a component exposed to a high temperature gas flow in which the component suffers from erosion damage.

It is another object of the present invention to reduce the cost of operating a gas turbine engine.

It is another object of the present invention to extend the life of a gas turbine engine.

The present invention is a process for determining a remaining life of a component exposed to a high temperature gas flow in which the gas flow can cause the component to suffer from erosion, corrosion or oxidation with extended exposure of the component to the gas flow. The eroded or corroded or oxidized component is removed from the operating environment and placed on a structure in which the component is scanned with an optical scanner (such as a white light scanner) to accurately produce a 3D solid model of the component including the damage caused by the erosion or corrosion or oxidation. The optical scanner is capable of detecting the depth of the erosion/corrosion/oxidation on the component with a high level of accuracy of within around 0.001 inches. The 3D model of the damaged component is then compared to a 3D model of a new component (component with no damage) to determine how much erosion or corrosion has occurred on the component. The 3D model of the new component can be the original component that is scanned before being used in the engine or can be a new but unused component similar to the used component suffering from the damage.

Next, the length of time in which the damaged component was used in the engine is determined such as from the operating log of the engine. With the depth of the erosion or corrosion damage to the component known and the length of time in which the damage occurred, the remaining life of the component can be determined from oxidation test results in tables of the material or from past experiments that compare erosion or corrosion damage based upon temperature exposure and time.

The 3D model of the damaged component can also be analyzed using a finite element analysis to determine if the damaged component is structurally capable of being used under the known engine operating conditions. An eroded or corroded region of the airfoil or component may make the airfoil too weak for additional use in the engine. Also, the eroded or corroded airfoil may more easily succumb to excess damage if used for too long when reintroduced into the engine. The airfoil or component may be suffering from a region of erosion or corrosion in which a hole is penetrating through the airfoil or component. An analysis can be performed to determine the potential detrimental effects and expected life of the deteriorated component or airfoil.

With the depth of the corrosion or erosion into the alloy and coating is determined, the damaged component can then be reanalyzed to determine how much more corrosion or erosion can occur on the component before the component will become unusable. Therefore, a component suffering from corrosion or erosion can be analyzed to determine what the remaining useful life for the component is. If the component has significant remaining life, then the component can be reused. If it is determined that the remaining life is limited, then the component can be discarded. Prior to scanning the damaged component, a new component configuration can be scanned before being placed into service in order to produce a 3D model of the unused component before any damage from erosion or corrosion occurs. In another embodiment, a similar new but unused component to the damaged component can be scanned for the comparison to determine how much damage has occurred to the used component.

The damaged components in which the process of the present invention can be used is for gas turbine engine components exposed to the high temperature gas flow, such as the turbine vanes id blades, turbine shrouds or other components in the engine such as the combustor section or the compressor section. Also, other components not used in a gas turbine engine but that are exposed to erosion or corrosion can also be analyzed using the process in order to determine a remaining useful life of the component. The process is not limited to components used in a gas turbine engine.

BRIEF DESCRIPTION OF THE SEVERAL VIEWS OF THE DRAWINGS

The FIGURE shows a flowchart for the process of determining a remaining useful life for a damaged airfoil.

DETAILED DESCRIPTION OF THE INVENTION

Figure 1:
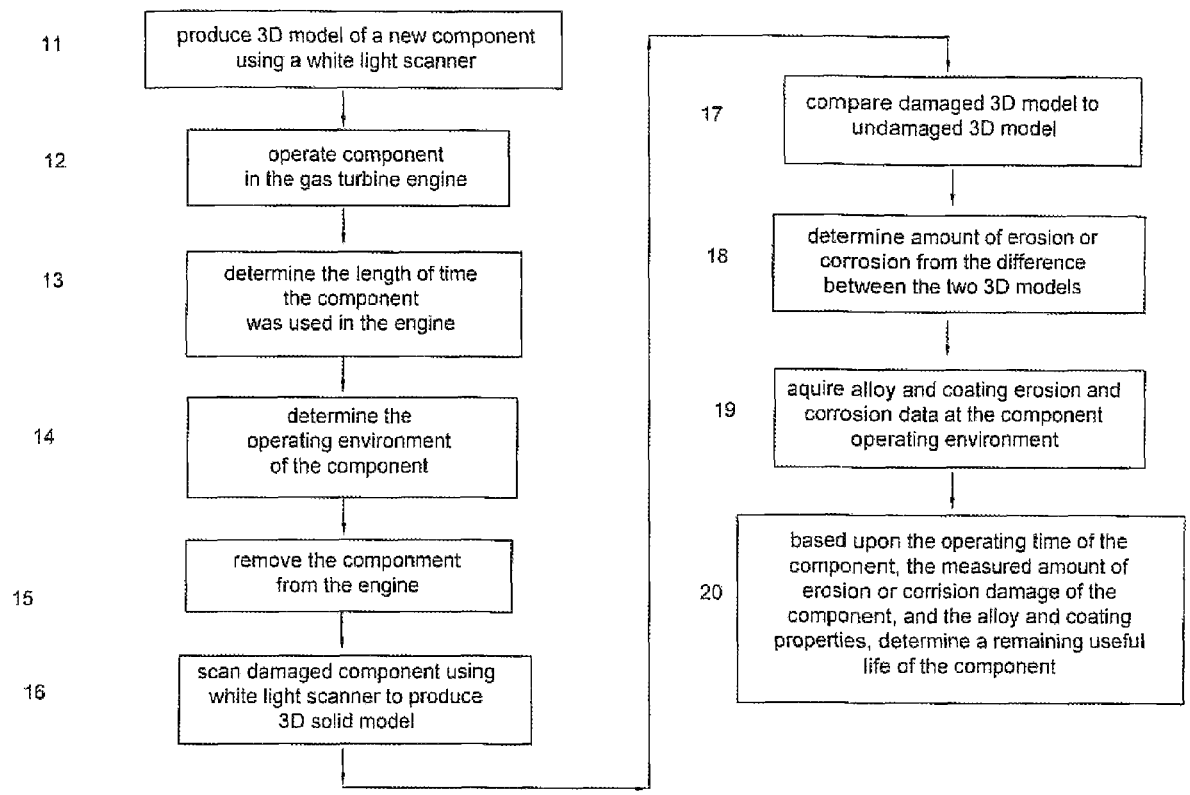

The process for determining a remaining life of a component exposed to erosion or corrosion from use in a high temperature environment is intended to be for a turbine airfoil such as a stator vane or a rotor blade. However, the process could be used for other components in a gas turbine engine such as shrouds or parts within the compressor, or for other components used in an apparatus other than a gas turbine engine. The process is shown in The FIGURE in which the first step 11 is to scan a component of interest, for example a turbine rotor blade, using an optical scanner (such as a white light scanner) and produce a 3D solid model of the component. A white light scanner is capable of producing a 3D model of such fine detail (in the order of 0.001 inches) that even small cracks will show on the solid model. In step 11, the component that is scanned is the component that will be placed into the engine or environment (step 12) in which the damage such as the erosion or corrosion will occur. Thus, a 3D solid model of the component is obtained before the component undergoes any damage. In another embodiment, a new component similar to the used and damaged component can be scanned in order to compare the damaged component with the undamaged component. A 3D solid model of the component is needed in order to use the finite element analysis program to analyze the component.

After the component has undergone exposure in the engine to the high temperature environment that will cause the erosion or corrosion damage, the engine is shut down (step 21) and the component is removed from the engine (step 15) and scanned again to produce a 3D model of the damaged component (step 16). An optical scanner such as a white light scanner is used to produce the 3D model because it can reproduce on the model the amount of erosion or corrosion occurring. A thermal analysis and a structural analysis of the damaged component 3D model are performed (step 22). From the thermal analysis and a structural analysis of the scanned solid model, the depth of erosion or corrosion can be determined by comparing the original undamaged solid model of the component with the solid model showing the damage (step 17).

In another embodiment, instead of scanning the original component prior to placement in the engine, a new component to the damaged component can be scanned at any time for comparison to the damaged component. The new component is considered to be the same part as the damaged part, but one that is not suffering from the damage such that any changes occurring on the damaged component can be detected by comparing the two components. In the case of a turbine blade, for example, the first stage of the turbine may have 20 blades all formed from the same casting so that the blades are basically identical. This would be considered as the same blade. For example, if the original new component was not scanned prior to the damage occurring, a new component having the same dimensions can be obtained and scanned for comparing to the damaged component.

When the undamaged solid model is compared to the damaged solid model, the differences can be determined that will represent the amount of damage occurred on the component (step 18). During the component's use—when the damage was done—the length of time (step 13) and the operating conditions of the component (step 14) such as the temperature is noted for use in determining the component's remaining life. For example, the length of time that the component was exposed in the engine is noted. With the length of time that the component was undergoing the erosion or corrosion damage, and the amount of damage done on the component for that length of time, the amount of remaining useful life for that component can then be determined (step 20). Material property tables or previous experiences with the particular material can be used to aid in this determination. If the remaining life of a damaged component is found to be longer than a certain time period, the damaged component is then reused in the engine (step 23). If the time period is less than the certain time period, then the damaged component is discarded and a new component is placed in the engine.

The turbine airfoil or component may also have a coating such as a TBC that will also suffer damage from time exposure to the hot gas flow. In order to analyze the damage occurring to the component, the alloy and coating corrosion and erosion data at the operating temperature environment must also be acquired (step 19). A certain TBC will deteriorate at a known rate when exposed to a known temperature for a known period of time. This data is used to analyze the remaining life of the TBC as well.

In one situation, a turbine component such as a blade may has a small spot of erosion occurring on the airfoil section that will eventually burn a hole through the airfoil and allow for the internal cooling air to flow out from the blade through the erosion induced hole. In some situations, this could be a major concern while in other conditions this could be allowable and still operate the damaged component in the engine. When the damaged component with the hole beginning to form from erosion is scanned, the 3D solid model of the damaged component can then be analyzed using a finite element analysis (FEA) program to determine how much longer the component can be used under the operating conditions before the hole becomes too large or breaks through the material to allow cooling air to flow out or hot gas to flow into the component such that continued use of the damaged component is not desired. The analysis can even be used to determine how long the damaged component can be used with the eroded hole allowing cooling air to flow out from the component before the hole becomes too large.

Another use in determining the amount of damage on the component is to determine if the component will suffer structural damage if the component is placed back into the engine and further used. For example, an airfoil damaged from erosion or corrosion can be analyzed using the well known engineering modeling tools such as a FEA program by analyzing the 3D model of the damaged component to determine the structural capabilities of the damaged component. The damaged component may not have suffered enough damage such that the component can still be used. Or, the damage may be so severe that continued use of the component would result in a failure of the component that could damage the entire engine.

In the embodiment when a 3D solid model of an undamaged component undergoing damage is not available, then a new or undamaged component is found and scanned to produce the 3D solid model for comparison to the damaged solid model component. The scanning of the undamaged component can be done after the damaged component is removed from the engine or operating environment. The two components—the damaged component and the undamaged component—can even be scanned together.

A component suffering from erosion or corrosion damage will have a portion of the original material missing or severely degraded such that the component will be weaker than the undamaged component. The process of the present invention is capable of detecting the amount of erosion or corrosion so that the component can be analyzed using computer modeling to determine if the component will be over-stressed. In one case, a hole might be formed in the part in which cooling an will escape from the normal cooling circuit of the component. The computer analysis can be used to determine if the component will still be cooled adequately or if the hole will weaken the component to the point that excessive stresses are developed. Also, the component can be analyzed to determine how much the hole will grow or how much longer the component can be used before the hole becomes big enough to require replacement of the component.

I claim the following:

1. A process for determining a remaining life of a high temperature component having erosion or corrosion damage, the process comprising the steps of:
   scanning the damaged component to produce a 3D solid model of the damaged component;
   scanning a new component of the damaged component with an optical scanner to produce a 3D solid model of the new component;
   determining the length of time and the temperature that the damaged component was exposed to the erosion or corrosion environment;
   comparing the damaged component 3D solid model to the new component 3D solid model to determine the amount of erosion or corrosion occurring on the damaged component; and,
   from the length of time that the damaged component was exposed to the erosion or corrosion environment, determining a remaining useful life of the damaged component.

2. The process for determining a remaining life of a high temperature component of claim 1, and further comprising the step of:
   the step of scanning a new component includes scanning a new component that is not the same damaged component.

3. The process for determining a remaining life of a high temperature component of claim 1, and further comprising the step of:
   the step of scanning a new component includes scanning the damaged component before the damaged component has been used in the erosion or corrosion environment.

4. The process for determining a remaining life of a high temperature component of claim 3, and further comprising the step of:
   the optical scanner is an optical scanner capable of reproducing details on the component of around 0.001 inches.

5. The process for determining a remaining life of a high temperature component of claim 4, and further comprising the step of:
   the optical scanner is a white light scanner.

6. The process for determining a remaining life of a high temperature component of claim 1, and further comprising the step of:
   the step of determining a remaining useful life of the damaged component includes analyzing the damaged component 3D solid model using a finite element analysis program.

7. The process for determining a remaining life of a high temperature component of claim 6, and further comprising the step of:
   the step of determining a remaining useful life of the damaged component includes performing a thermal and a structural analysis of the damaged component 3D solid model.

8. The process for determining a remaining life of a high temperature component of claim 6, and further comprising the step of:
   the step of determining a remaining useful life of the damaged component includes determining how much longer a hole formed in the damaged component by the erosion or corrosion environment will grow.

9. The process for determining a remaining life of a high temperature component of claim 6, and further comprising the steps of:
   the step of determining a remaining useful life of the damaged component includes determining a remaining useful life of the coating includes the step of determining the alloy and coating properties on the damaged component.

10. The process for determining a remaining life of a high temperature component of claim 1, and further comprising the step of:
    the scanned component is a component used in a gas turbine engine.

11. The process for determining a remaining life of a high temperature component of claim 10, and further comprising the step of:
    the scanned component is a turbine airfoil.

12. The process for determining a remaining life of a high temperature component of claim 10, and further comprising the step of:
    the scanned component is a compressor airfoil.

13. The process for determining a remaining life of a high temperature component of claim 10, and further comprising the step of:
    the scanned component is part of a combustor in a gas turbine engine.

14. A process of refurbishing a gas turbine engine comprising the steps of:
    shutting down the gas turbine engine;

removing a damaged component from the gas turbine engine that is exposed to erosion or corrosion damage suffered from being used in the gas turbine engine;

scanning the damaged component to produce a 3D solid model of the damaged component;

scanning a new component of the damaged component with an optical scanner to produce a 3D solid model of the new component;

determining the length of time and the temperature that the damaged component was exposed to the erosion or corrosion environment;

comparing the damaged component 3D solid model to the new component 3D solid model to determine the amount of erosion or corrosion occurring on the damaged component;

from the length of time that the damaged component was exposed to the erosion or corrosion environment, determining a remaining useful life of the damaged component; and, re-using the damaged component in the gas turbine engine if the remaining useful life is longer than a certain time period and replacing the damaged component if the remaining useful life is not longer than the certain time period.

15. The process of refurbishing a gas turbine engine of claim 14, and further comprising the step of:

the damaged component is a turbine rotor blade, or a turbine stator vane, or a compressor blade, or a compressor vane, or a combustor component.

* * * * *